Patented Dec. 16, 1952

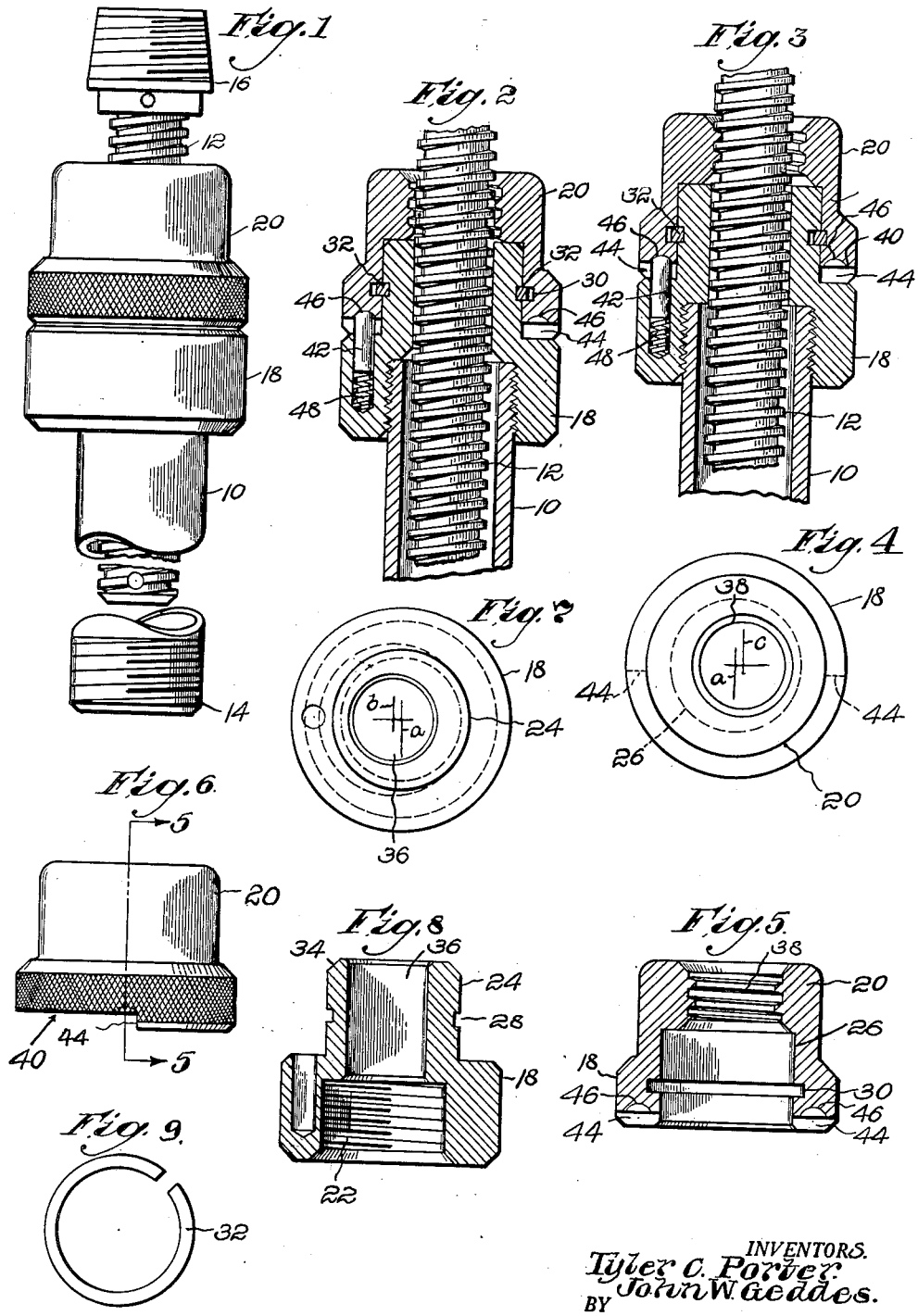

2,621,948

UNITED STATES PATENT OFFICE 2,621,948

EXTENSIBLE STRUT FOR RESHAPING DEFORMED AUTOMOBILE BODIES

John W. Geddes and Tyler C. Porter, Boston, Mass., assignors to H. K. Porter, Inc., Somerville, Mass., a corporation of Massachusetts Application March 12, 1949, Serial No. 81,113

1 Claim. (Cl. 287—62)

This invention relates to an adjustably extensible strut for transmitting thrust in connection with the repair of deformed automobile body parts. Usually it will be utilized in connection with a jack for effectively extending the reach of the jack either by supporting it through the strut from some relatively remote point, or by supporting a tool from the jack at a considerable distance therefrom. Various mechanical devices of this general type have been proposed and used with a greater or less amount of convenience and facility for accomplishing these general purposes.

The object of the present invention is to provide a construction of slight bulk and weight as consistent with adequate strength and, in itself and when used in connection with a sleeve or pipe as herein disclosed, of an over-all rod-like form, being of smooth contour, free of troublesome projections, and one quickly and easily operated to effect the desired alterations in its effective length.

The invention will be well understood by reference to the following description taken in connection with the accompanying drawings wherein an illustrative embodiment thereof is shown and wherein:

Fig. 1 is an elevation of the extensible strut mounted on a sleeve or pipe with parts broken away to reduce the over-all height of the figure;

Fig. 2 is a fragmentary, vertical section illustrating the parts of the strut disengaged to permit rapid adjustment;

Fig. 3 is a similar view showing the parts in position to carry thrust;

Fig. 4 is a plan as seen from the upper side, viewing Fig. 1 of the upper of two elements constituting a coupling;

Fig. 5 is a central, transverse section thereon taken on the line 5—5 of Fig. 6;

Fig. 6 is a side elevation of said member;

Fig. 7 is a plan of the lower member;

Fig. 8 is a transverse section thereof, taken on the line 8—8 in Fig. 7; and

Fig. 9 is a plan view of a locking ring which is used in the construction.

The extensible strut is mounted on the end of an external cylindrical sleeve 10 and comprises a threaded shaft 12 which extends into the same and is adapted to be fixed in position with some desired portion of its length projecting beyond the sleeve. The sleeve here shown is provided at its lower end with a thread 14, whereby it may be assembled with some cooperating element such, for example as the ram of a hydraulic jack, by means of which thrust is exerted through the strut on the work. Such a sleeve is a piece of equipment commonly used with a jack for bending automobile parts and is in a sense a hollow centered extension of one of the jack elements. The shaft 12 is shown as provided with an externally threaded head or coupling member 16, whereby it may be assembled with some other element as, for instance, a so-called spoon for exerting pressure on a deformed panel of an automobile body.

To secure the sleeve 10 and the shaft together while providing for their relative adjustment a coupling is provided comprising two superposed members which, for convenience in referring to the drawing, may be arbitrarily termed a lower member 18 and an upper member 20. Herein the lower member may be connected to the sleeve 10 in a semi-permanent manner, as a pipe fitting is secured to a pipe, by means of an internal thread 22, while the upper member 20 may be quickly engaged with and disengaged from the thread of the shaft 12 in a manner to be described.

The two members 18 and 20 are essentially solids of revolution and in their superposed position in all positions of their relative adjustment correspond substantially to a single solid of revolution. Exact circularity is of course not required. Thus, in the drawing the member 20 is shown with a checkered surface to facilitate grasping the same with the hand for turning, this being the equivalent of slight flats, but there are no abrupt projections or handle portions likely to be fouled. The members are of the same general cross-sectional contour and not much different in size from the relatively adjustable elements 10 and 12 themselves.

The lower member 18 is provided with a cylindrical plug 24 (see Fig. 8) which enters a cylindrical socket 26 on the upper member (see Fig. 5), this construction providing a bearing for the relative rotation of the two members one on the other. The center line of the cylindrical surfaces, $a$ in Figs. 4 and 7, is the same as that of the exterior surfaces of the member which thus retain their exterior alignment, whatever their relative angular position.

To secure together the two members 18 and 20, while permitting their rotative adjustment, there is preferably utilized the mechanism shown which is received inwardly of the exterior surfaces of the coupling. The plug 24 and the socket 26 have grooves 28 and 30 respectively which face each other when the parts are assembled. A split locking ring 32 (Fig. 9) is received partly in one groove and partly in the other. The groove 30 may be of sufficient depth completely to receive the ring 32 if the latter is sufficiently extended. The ring may be compressed and passed up into the socket 26 and permitted to expand into the groove. The end of the plug 24 may be tapered off at 34, as best seen in Fig. 8. This provides a wedging or camming surface which, when the plug is pushed up into the socket, will expand the ring entirely into the groove 30, permitting the advance of the plug 24 until the two grooves come opposite one another, when the ring 32 will snap back and be housed partly in one groove and partly in the other, as shown in Figs. 2 and 3, thus locking the members together. The ring is here shown as of rectangular cross-section, as are the grooves, so that the parts are permanently locked against axial separation.

The plug 24 (see Fig. 8) is formed with a bore 36 only slightly larger than the major diameter of the threaded shaft, so as to provide a guide in which the shaft may slide. The center line $b$ of this guide (Fig. 7) is eccentric to the center of the plug at $a$. The other member 20 is in a sense a nut, being provided (see Fig. 5) with an internal thread 38. The thread is of the same contour and pitch as that on the shaft 12. However, the minor (inside) diameter of this female thread is slightly greater than the major (outside) diameter of the male thread of the shaft so that, when the two threads are concentrically disposed, as in Fig. 2, the shaft can slide freely through the nut. The center line $c$ of the female thread (see Fig. 4) is eccentric to the socket 26, the center line of which is at the point $a$ in Fig. 4.

In describing the relative positions of the parts of the coupling, it will be convenient to consider their changes as affected solely by rotation of the upper element 20 on the lower 18, considering the latter as stationary. If the center line $b$ of the guiding bore 36 and the center line $c$ of the nut are on the same side of the center line $a$ of the plug, the two eccentricities cancel out and the parts have the position of Fig. 2. Now as we turn the member 20 until the center line $c$ lies at the opposite side of the center line $a$ from center line $b$ of the guide bore 36, the threads of the nut will be gradually moved into mesh with those of the shaft at one side thereof, to the position shown in Fig. 3, locking the shaft 12 against longitudinal movement in the sleeve 10.

A portion of the lower margin of member 20 may be cut away over a little more than half a circumference, as indicated at 40, and the member 18 may be provided with a pin 42, inwardly of its exterior surface and parallel to the axis, the end of which pin is received in the cut-away portion 40, and cooperates with the end surfaces 44 thereof to provide stops limiting the rotary adjustment of the parts between the extreme positions illustrated in Figs. 2 and 3 respectively. Herein the surface opposed by the pin is provided adjacent the stop surfaces 44 with recesses 46 of rounded contour and the pin 42 is yieldably supported by a spring 48 so that the pin will enter these recesses and tend to hold the parts in their extreme positions without opposing any substantial impediment to a voluntary movement from one to another by manual force.

In normal use the coupling 20 would be grasped by the encircling fingers of one hand and the shaft 12 with the other. A slight rotating movement of the upper member 20 which in practice might be exerted by a wiping movement of the extended thumb of the former hand positions the parts as in Fig. 2, releasing the shaft and permitting it to be drawn out as desired. A return movement locks it. When locked the shaft may be turned, working in the nut in the manner of a screw, to effect minor adjustment as, for instance, to bring a tool carried at the end of the shaft into abutting relation to the work with sufficient pressure to preclude casual displacement before the operating thrust of the jack is exerted.

It will be noted that the device as a whole, is a slim, rod-like body, free of projections, thus permitting it conveniently to be passed into the interior of an automobile body, for example, and to be positioned if necessary in close contiguity to some portion of the structure. The hand may reach the coupling from any radial direction and operate it by a simple turning movement, even a wiping movement of the hand over its nearer side, since in the preferred form illustrated the outer circumferences of the two coupling members remain in alignment in all positions of rotative adjustment.

The device has been referred to as a strut and, indeed, it is anticipated that its most general use will be to transmit thrust. It will be clear that when the coupling parts 18 and 20 are interlocked, as herein, by a permanent locking element of adequate strength the adjustable column, if suitably engaged at its ends, may be operated under tension from a suitable source of power.

Since the sleeve or pipe 10, as already stated, is an element used with a jack for other purposes, for instance, as an extension of fixed length, it has not been included positively as an element of the following claim. The coupling and shaft may conveniently be vended as a unit to those already owning a jack and sleeve.

We are aware that the invention may be embodied in other specific forms without departing from the spirit or essential attributes thereof, and we therefore desire the present embodiment to be considered in all respects as illustrative and not restrictive, as is in fact clear in several matters from the description itself. Reference is to be had to the appended claim to indicate those principles of the invention exemplified by the particular embodiment described and which we desire to secure by Letters Patent.

An adjustably extensible thrust element adapted to be positioned on the end of a cylindrical sleeve and providing for the transmission of thrust lengthwise thereof including an internal, threaded shaft adapted to be positioned for an adjustably variable part of its length within the sleeve and a coupling comprising two superposed members one of which has means for mounting it at one end of the sleeve, the two members having external surfaces substantially of the form of surfaces of revolution, one member having a cylindrical socket extending axially partially through its longitudinal structure, and the other member having a cylindrical plug portion axially extending from one of its ends for snugly seating within the socket of the other member, both concentric with the outer surface and providing a bearing for relative turning movement of the two members, one member being formed with a smooth axial bore eccentrically arranged with respect to its cylindrical surface to provide a guide for the threaded shaft, said guide surface being of a slightly greater diameter than the diameter of the threads on said shaft, the other member having a similar eccentric bore of slightly greater diameter than the uninterrupted guideway, said last bore being formed with threads to cooperate with the threads of said shaft, said second bore being transversely shiftable by relative rotation of the superimposed parts to align the bores axially and simultaneously urge threads of the second bore into mesh with the threads of the shaft, means for locking the members against relative movement after meshing of the threads, and means for locking the plug against longitudinal displacement in the socket, including an arcuate channel formed in one wall of one of the members, and a key carried by the adjacent wall of the other member and extending into said channel.

JOHN W. GEDDES.
TYLER C. PORTER.

REFERENCES CITED

The following references are of record in the file of this patent:

UNITED STATES PATENTS

| Number | Name | Date |
|---|---|---|
| 788,716 | Hammond et al. | May 2, 1905 |
| 951,945 | Feix | Mar. 15, 1910 |
| 995,997 | Bilhartz | June 20, 1911 |
| 1,627,745 | Madden | May 10, 1927 |
| 1,638,788 | Vissering | Aug. 9, 1927 |
| 1,845,123 | Buhr | Feb. 16, 1932 |
| 2,074,393 | Hixon | Mar. 23, 1937 |
| 2,218,319 | Pfauser | Oct. 15, 1940 |